May 13, 1930.  L. B. OLIN  1,758,529
REFRIGERATOR VEHICLE
Filed Jan. 30, 1929  4 Sheets-Sheet 1
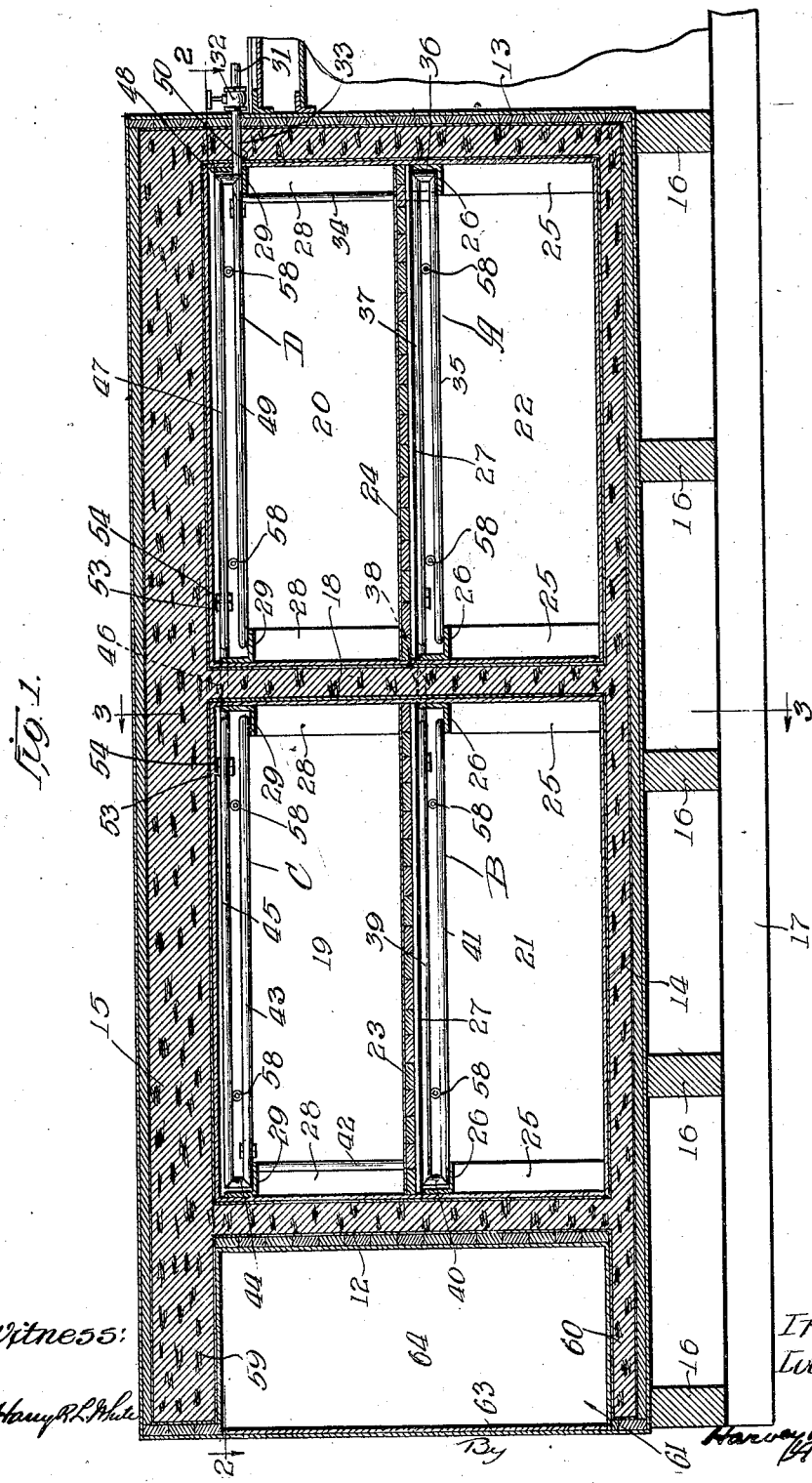

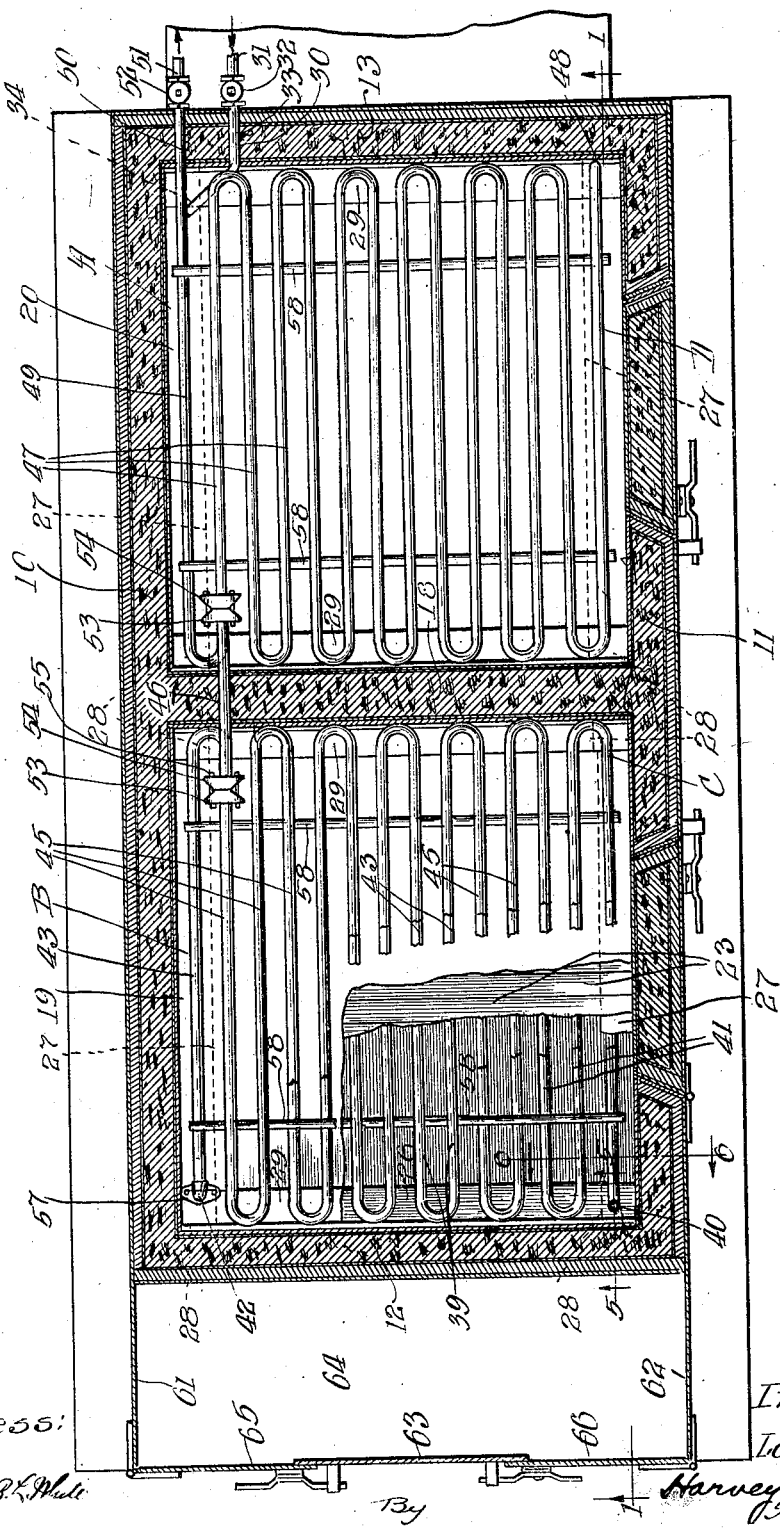

May 13, 1930.  L. B. OLIN  1,758,529
REFRIGERATOR VEHICLE
Filed Jan. 30, 1929  4 Sheets-Sheet 3
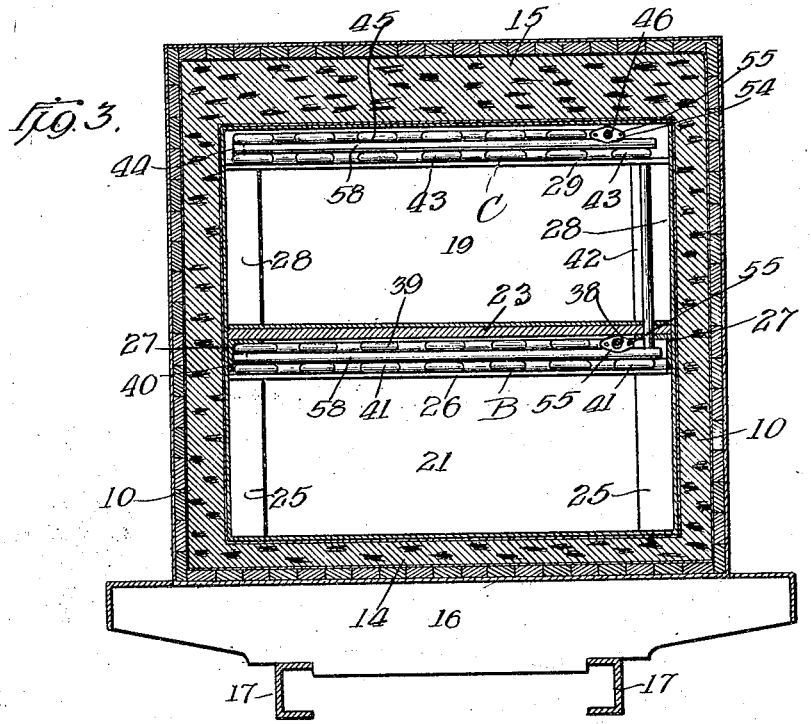
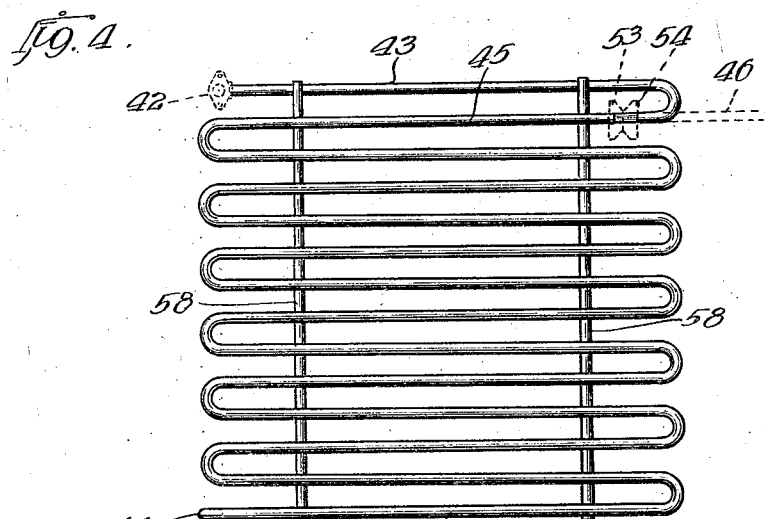
Witness:
Harry R. L. White.
Inventor:
Louis B. Olin
By Harvey L. Hanson
Attorney.

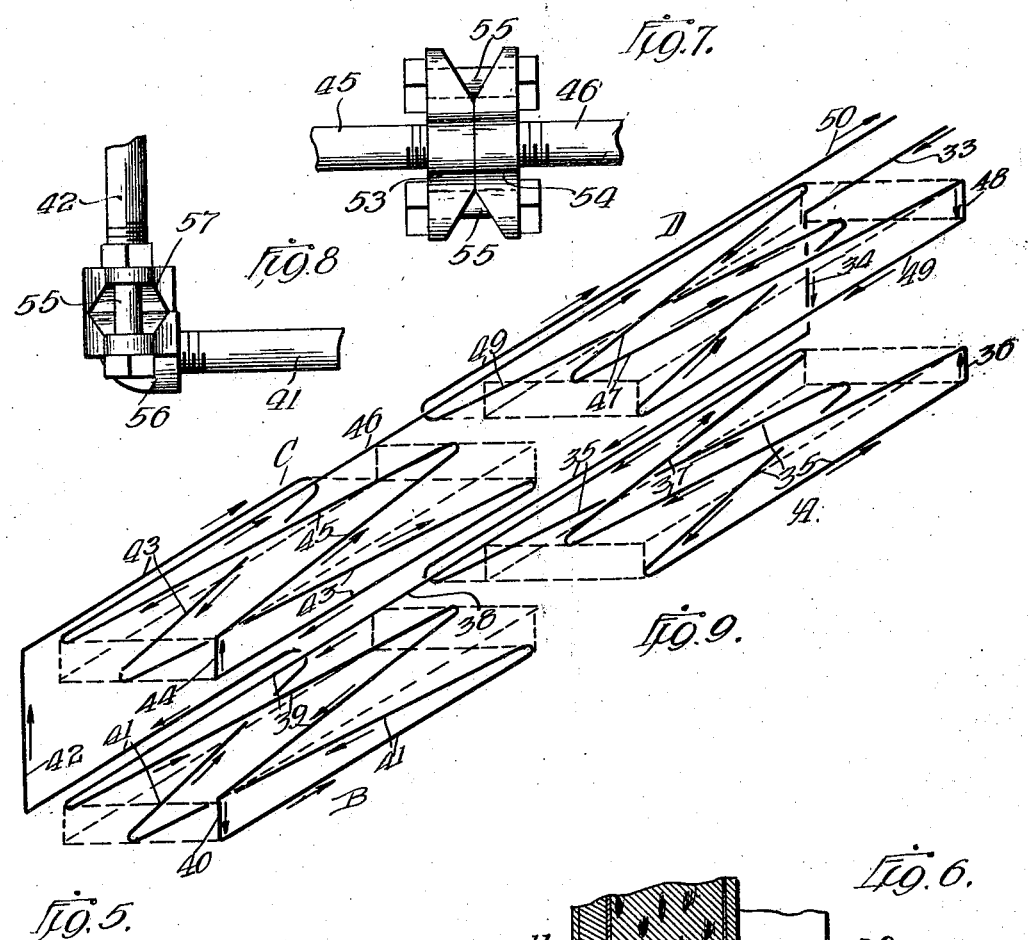

Patented May 13, 1930

1,758,529

UNITED STATES PATENT OFFICE

LOUIS B. OLIN, OF CHICAGO, ILLINOIS

REFRIGERATOR VEHICLE

Application filed January 30, 1929. Serial No. 336,126.

The invention relates to a refrigerator vehicle, and particularly to a motor driven vehicle of the type used for transportation of ice cream and other food products.

The primary object of the invention is to maintain the automobile ice-cream truck in a very cold condition so as to preserve the ice cream or other food products contained in the truck, in a refrigerated condition for long periods of time. Trucks equipped with the invention have been in daily use for a considerable length of time and have been on long trips, and it has been demonstrated that the operation of the trucks has been economical and very satisfactory. In many respects the trucks containing the invention exceed in economy of operation and satisfaction to all concerned, trucks which carry and employ brine tanks or ice and salt for the refrigerating mixture.

It is one of the important objects of the invention to employ ammonia or ammonia gas as the refrigerating medium which is supplied to the vehicle from an outside source and passes through a continuous pipe which is formed in such a manner that it lies in superposed tiers or layers in certain formations at the top of the individual cooling chambers of the truck. In other words, the continuous pipe entering the truck at the desired inlet location passes backward and forward, and up and down, as required, and emerges adjacent the inlet portion of the pipe conveniently located to be connected with the exterior ammonia supply. Liquid ammonia flows into the continuous pipe from an exterior ammonia condensing and compressing system and changes to a vaporous state, becoming ammonia gas and is passed into the continuous pipe under proper pressure a sufficient length of time to enable the ammonia to thoroughly cool the refrigerating chambers of the truck.

A further object of the invention is to construct the continuous pipe used for refrigerating purposes in superposed sections, portions or units, which are interchangeable and by the use of proper connectors or unions may be joined together in a minimum amount of space to cause a maximum amount of refrigeration. The cold air from the continuous pipe from each of the superposed interchangeable units passes downwardly into the freezing compartments wherein have been placed the ice cream or other commodities to be frozen or kept in a frozen condition. The fact that the truck walls and partitions are insulated by comminuted cork or other suitable insulation, on every side but the direction of the passage of the cold air, aids in the gradual downward passage of the cold air from the pipe into the freezing compartments.

It will be understood that not only may ammonia be used as the refrigerant in connection with the invention, but any other form of refrigerant may be used, such as carbon dioxide, sulphur dioxide, methyl chloride, ethyl chloride, methyl ether, ethyl ether and the hydrocarbons. It will therefore also be understood that whenever ammonia is mentioned in this application it is intended to include any form of refrigerant.

By the employment of the system of the invention it will be apparent that many objectionable features resulting from the use of ice and salt refrigerating are obviated. By means of the invention, the ice cream, whether in cans or in package form, does not come in contact with the ice and salt or any moisture, and the danger of contamination, spoilage or deterioration of the ice cream is completely eliminated. This would be equally true if any other food product should be transported in the truck.

Another feature of great importance in connection with the invention is that because of the placing of the unit coils of the continuous pipe at the tops of the respective cooling compartments, and because no bins or compartments are required for the ice and salt, or a mixture thereof, a larger and greater amount of storage space is obtained in the vehicle itself, than is usually the case, thus resulting in great economy in operation.

It will also be obvious that, because of the elimination of the ice and salt compartments and the use of shovels and pails, wear and tear on the truck is reduced to a minimum. There is entailed merely the opening and closing of the doors to put in and take out of the freezing compartments the cans or packages of ice cream free from all ice and salt, resulting in a clean product, longer life and a better appearance to the truck.

It is a further object of the invention to place the coil units of the continuous pipe in the tops of each of the freezing compartments of the truck in horizontal superposed tiers, and so support them with relatively strong corner posts and angle irons, and separate the respective tiers of the coil units with suitable separators, that the continuous pipe with its various coil units shall not become loose and move about, rattle or make a noise, or cause annoyance during operation of the truck.

One of the great objections in connection with the handling and transportation of ice cream in large cities is that the use of ice and salt is unsanitary, unclean, mussy, and leaves a wet icy trail in the stores, apartments and other places where ice cream is delivered, and also on the sidewalk in front of the stores, residences, or other places, and frequently large piles of ice and salt are left in the street and on the edge of the sidewalk when the attendant fills the pails for the user. By the use of the truck of the invention these difficulties are all avoided.

The invention will be explained and more readily understood when read in conjunction with the accompanying drawings, it being understood, that changes and modifications may be made without departing from the spirit of the appended claims forming a part thereof.

In the drawings:

Figure 1 is a longitudinal vertical sectional view of the truck body on the line 1—1 of Figure 2, showing the continuous refrigerating pipe and the respective unit coils thereof in the tops of the various freezing compartments.

Figure 2 is a longitudinal horizontal sectional view of the truck body on the line 2—2 of Figure 1, with various parts broken away to show the horizontal tiers of some of the coil units of the continuous refrigerating pipe.

Figure 3 is a transverse vertical sectional view on the line 3—3 of Figure 1 looking toward the rear of the truck.

Figure 4 is a plan view of one of the interchangeable coil units of the continuous pipe employed in the truck.

Figure 5 is an enlarged detail view of a portion of the wall of the truck taken on the line 5—5 of Figure 2, and shows the method of support used in connection with the refrigerating pipe, and illustrates both horizontal tiers of the particular coil unit.

Figure 6 is another enlarged detail view of a portion of the wall of the truck taken on the line 6—6 of Figure 2 and illustrates both horizontal tiers of the same coil unit as is illustrated in Figure 5.

Figure 7 is a detail view showing the joining of the ends of two portions of the continuous pipe with a pair of so called ammonia couplers.

Figure 8 is a detail view of the ends of two sections of the pipe at right angles to each other joined by a pair of so called ammonia couplers, and Figure 9 is a diagrammatic view of the continuous refrigerating pipe shown with the interchangeable coil units in the relationship in which they are placed in the truck body.

The motor-driven truck of the invention is provided with outer side walls 10 and 11, and outer end walls 12 and 13. The truck body is provided with the floor 14 and the top wall 15, and rests on the transverse supports 16, which, in turn, are supported by the chassis 17 of the vehicle.

Cork insulation, which may be of any form, but which is preferably of comminuted cork, is placed over the entire floor 14 and around the top, side and end walls of the truck. It is also placed in the vertical dividing partition 18.

The interior of the truck body is divided into four relatively large freezing compartments 19, 20, 21 and 22, each having an entrance door in the side wall 11. It will be understood, however, that any number of compartments may be formed in the truck body. The compartments 19, 21, and 20, 22, respectively, are separated from each other by horizontal partitions 23 and 24.

The exteriors and interiors of the side walls 10 and 11, the end walls 12 and 13, the top wall 15, the floor 14 and the vertical central partition 18 are suitably covered with insulating sheathing and metal so as to increase the efficiency of the truck.

Upright corner posts 25 are placed in each of the corners of the lower compartments 21 and 22 and are suitably secured to the adjacent walls. Angle irons 26 are placed on the top of the upright corner posts 25 and extend transversely of the truck. The angle irons 26 are at the sides of the freezing compartments 21 and 22 respectively. Additional angle irons 27 extend from the front and rear or end walls 12 and 13 to the intermediate wall or central partition 18 of the truck, and therefore at right angles to the angle irons 26. The angle irons 26 and 27 are suitably secured to the end walls 12 and 13, the vertical partition 18 and the side walls 10 and 11. The dividing partitions 23 and 24 between the freezing compartments 19, 21 and 20, 22, respectively, are supported by the angle irons 27.

Placed upon the dividing partitions 23 and 24 and in the corners of the freezing compartments 19 and 20 are upright corner posts 28. The corner posts 28 support the angle irons 29 which are in the top of the freezing compartments 19 and 20 and extend transversely of the truck in a manner similar to the transverse angle irons 26, in the lower compartments.

The refrigerating pipe generally designated 30 is preferably a continuous pipe which extends into the truck at the forward end thereof, and is formed with various unit coils hereinafter designated A, B, C and D, which are placed at the tops of each of the compartments 22, 21, 19 and 20, respectively, and terminates with its outlet adjacent the inlet.

The inlet end of the pipe 30 is connected to the inlet pipe 31 which extends from the exterior station for the ammonia supply. The valve mechanism 32 is provided for opening and closing the inlet. The continuous pipe 30 has its portion 33 extend to the upper rear corner of the freezing compartment 20, thence downwardly by the section 34 to the lower horizontal tier 35 of the unit coil A in the top of the freezing chamber 22, thence to the vertical riser 36 at the front of the freezing chamber 22, thence to the upper horizontal tier 37 of the unit coil A, thence to the connecting section 38 which connects the unit coil A with the coil B in the top of the freezing chamber 21, thence to the upper horizontal tier 39, thence to the downwardly extending elbow 40 to the lower horizontal tier 41 of the unit coil B, thence to the upwardly extending section 42 to the lower horizontal tier 43 in the unit coil C in the top of the freezing chamber 19, thence to the riser 44, thence to the upper horizontal tier 45, thence to the connector 46 which connects coil unit C with the coil unit D in the top of the freezing chamber 20, thence to the upper horizontal tier 47 of the coil unit D, thence to the downwardly extending elbow 48, thence to the lower horizontal tier 49, thence to the outlet section 50 which in turn connects with the outlet pipe 51 by means of the valve mechanism 52.

The unit coils A, B and C, D respectively, are joined at their inner ends with the connection pipe sections 38 and 46 by the pairs of ammonia couplers 53 and 54, such as are shown in Figure 7. The ammonia couplers are held together in their proper relation by the bolts and nuts 55.

The lower horizontal tier 41 of the coil unit B is joined to the upwardly extending section 42 by means of the ammonia couplers 56 and 57 as shown in Figure 8. Ammonia couplers similar to those shown in Figure 8 are used in joining the pipe sections 34 with 35 in coil unit A, and 42 with 43 in the coil unit C.

The very important feature with respect to the interchangeable coil units A, B, C and D, in order to secure proper disposition and placement of the coil units in the continuous pipe generally designated 30, is to extend the lower horizontal tiers beyond the upper horizontal tiers of each of the unit coils A, B, C and D. This is most clearly shown in Figures 2, 3 and 4 of the drawings. In Figure 2 the portion of the lower horizontal tier 43 which extends below and beyond the upper tier 45 in coil unit C is shown adjacent the side wall 10. The same situation applies to the lower horizontal tier 49 below and beyond 47 in section D, which has the extending portion connecting with the outlet pipe 51.

The portions of the lower horizontal tier 43 which extend beyond the upper horizontal tier 45 in the coil unit C is also shown in Figure 4 and in the right hand upper portion of Figure 3.

The portion of the pipe of the lower horizontal tier 41 which extends beyond the upper horizontal tier 39 of the coil unit B, is best shown in Figure 3. In other words, the extended portion of the lower tiers of unit sections B and C are identical.

The portion of the pipe of the lower horizontal tier 35 which extends below and beyond the upper horizontal tier 37 of the unit coil A is identical with the portion of the pipe of the lower horizontal tier 49 which extends beyond the upper horizontal tier 47 of the coil unit D.

The upper and lower horizontal coil tiers of the units A, B, C and D are spaced from each other by the transverse spacer bars 58. These spacer bars 58 may be sections of metallic pipe which are secured to each of the coils of the units, as by welding.

It will therefore be seen that aside from the small connector portions, that the unit coils A, B, C and D are unitary structures and may be handled as such in connection with their assembly and installation in the truck. The various units may be placed into position on the angle irons 26 and 29 on the various corner posts 25 and 28 and then joined together by the connector pipe portions so as to form the continuous pipe generally designated 30.

From the fore-going description of the continuous pipe generally designated 30 and the various coil units A, B, C and D, it will be seen that coil units A and D are interchangeable with each other and that the coil units B and C are interchangeable with each other.

It will also be understood that all of the joints and fittings of the continuous pipe generally designated 30, and the openings in the front wall 13 and the center wall 18 through which portions of the continuous pipe extend, will be carefully closed and sealed against the discharge of ammonia or ammonia gas and the admission of air, respectively. The various elbows and risers of the coil units A, B, C and D are suitably connected together and preferably by welding.

The truck body is constructed with the rearwardly extending top wall 59, floor 60 and side walls 61 and 62, and rear wall 63, to form the used can chamber 64. Suitable doors 65 and 66 are placed in the rear wall to permit access to the chamber 64.

Having thus described the invention, what I claim and desire to secure by Letters Patent is:

1. In a motor vehicle for transporting ice cream or other commodities, the combination of outer walls, a central vertical dividing wall, four freezing compartments, two on each side of said central vertical dividing wall, one above the other, a continuous pipe adapted to contain a refrigerating gas extending from the exterior of one of said walls through each of said freezing chambers at the tops thereof, said continuous pipe extending from the exterior of the truck at the front wall passing to a lower horizontal tier in the first compartment, thence to an upper horizontal tier in said first compartment, thence to an upper horizontal tier in a second compartment, thence to a lower horizontal tier in said second compartment, thence to a lower horizontal tier in the third compartment, thence to the upper horizontal tier in said third compartment, thence to an upper horizontal tier in the fourth compartment, thence to the lower horizontal tier in said fourth compartment, thence to the exterior of said wall adjacent the inlet portion of said continuous pipe.

2. In a motor vehicle for transporting ice cream or other commodities, the combination of outer walls, a central vertical dividing wall, four freezing compartments, two on each side of said central vertical dividing wall, one above the other, a continuous pipe adapted to contain a refrigerating gas extending from the exterior of one of said walls through each of said freezing chambers at the tops thereof, said continuous pipe extending from the exterior of the truck at the front wall passing to a lower horizontal tier in the first compartment, thence to an upper horizontal tier in said first compartment, thence to an upper horizontal tier in a second compartment, thence to a lower horizontal tier in said second compartment, thence to a lower horizontal tier in the third compartment, thence to the upper horizontal tier in said third compartment, thence to an upper horizontal tier in the fourth compartment, thence to the lower horizontal tier in said fourth compartment, thence to the exterior of said wall adjacent the inlet portion of said continuous pipe, portions of said continuous pipe being in unitary coils, two of said coils being interchangeable one with another, each of said interchangeable portions of said continuous pipe having upper and lower tiers of pipes, said tiers of pipes being superposed except that a section of the lower tier extends beyond the upper tier.

3. In a motor vehicle for transporting ice cream or other commodities, the combination of outer walls, a central vertical dividing wall, four freezing compartments, two on each side of said central vertical dividing wall, one above the other, corner posts in each of the corners of said freezing compartments, said corner posts being shorter in height than said compartments, angle irons above said corner posts, said angle irons with the walls above and at the sides forming pockets, a continuous pipe adapted to contain a refrigerating gas extending from the exterior of one of said walls through each of said freezing chambers at the tops thereof, said continuous pipe extending from the exterior of the truck at the front wall and passing to a lower horizontal tier in the first compartment, thence to an upper horizontal tier in said compartment, thence to an upper horizontal tier in a second compartment, thence to a lower horizontal tier in said second compartment, thence to a lower horizontal tier in the third compartment, thence to the upper horizontal tier in said third compartment, thence to an upper horizontal tier in the fourth compartment, thence to the lower horizontal tier in said fourth compartment, thence to the exterior of said wall adjacent the inlet portion of said continuous pipe, portions of said continuous pipe being in unitary coils, two of said coils being interchangeable one with another, each of said interchangeable portions of said continuous pipe having upper and lower tiers of pipes, the tiers of pipes being superposed except that a section of the lower tier extends beyond the upper tier, said interchangeable unitary coils being adapted to slide into said pockets and be supported by said posts.

In witness whereof, I hereunto subscribe my name this 19th day of January, A. D. 1929.

LOUIS B. OLIN.